United States Patent
Frome

(10) Patent No.: US 9,268,514 B2
(45) Date of Patent: *Feb. 23, 2016

(54) FORMATTING DATA

(71) Applicant: Accenture Global Services Limited, Dublin (IE)

(72) Inventor: Eric Allan Frome, Farmington, MN (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,402

(22) Filed: Nov. 3, 2014

(65) Prior Publication Data

US 2015/0049351 A1    Feb. 19, 2015

Related U.S. Application Data

(63) Continuation of application No. 13/013,406, filed on Jan. 25, 2011, now Pat. No. 8,902,455.

(51) Int. Cl.
*G06K 15/02* (2006.01)
*G06F 3/12* (2006.01)
*G06Q 10/02* (2012.01)
*G06Q 10/06* (2012.01)

(52) U.S. Cl.
CPC ............. *G06F 3/1243* (2013.01); *G06F 3/122* (2013.01); *G06F 3/1286* (2013.01); *G06K 15/021* (2013.01); *G06K 15/181* (2013.01); *G06K 15/1807* (2013.01); *G06Q 10/02* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 4,965,437 A | 10/1990 | Nagai | |
| 2002/0171857 A1 | 11/2002 | Hisatomi et al. | |
| 2003/0055690 A1* | 3/2003 | Garback | 705/5 |
| 2003/0058469 A1 | 3/2003 | Buis et al. | |
| 2004/0030658 A1* | 2/2004 | Cruz | 705/65 |
| 2009/0261571 A1 | 10/2009 | Dungan et al. | |
| 2010/0100810 A1 | 4/2010 | Nakamura et al. | |

FOREIGN PATENT DOCUMENTS

WO    WO2005114477 A1    12/2005

OTHER PUBLICATIONS

DeSmet, European Examination Report in corresponding European application No. EP12000473 dated Oct. 7, 2015, 7 pages.
DeSmet, European Search Report in corresponding European application No. EP12000473 dated Apr. 10, 2012, 6 pages.
McCarthur, Office action in corresponding Australian patent application No. 2012200340 dated Jan. 24, 2013, 3 pages.
McCarthur, Second Office action in corresponding Australian patent application No. 2012200340 dated Aug. 7, 2013, 3 pages.

* cited by examiner

*Primary Examiner* — Fan Zhang
(74) *Attorney, Agent, or Firm* — Fish & Richardson P.C.

(57) ABSTRACT

Data from different sources and having different formats is converted to a format useable by a device to which the data is to be sent. The conversion is performed based on configuration data and can be performed by an application server configured to provide a network application service to a user terminal associated with the entity.

27 Claims, 5 Drawing Sheets

FORMATTING DATA

CROSS-REFERENCE TO RELATED APPLICATIONS

This application is a continuation of and claims priority to U.S. Patent Application Ser. No. 13/013,406, filed on Jan. 25, 2011, the entire contents of which are hereby incorporated by reference.

TECHNICAL FIELD

This disclosure relates to formatting data.

BACKGROUND

In networked environments, data can be transferred from one network entity to another across different functional or operational platforms. In some situations, a specific data format may be required by a network entity in order for the data to be usable by the network entity. For example, a first network entity that is coupled to a second network entity may be configured to output data in a data format required by the second network entity. In some systems, such as proprietary systems, all network entities may be configured to use a common data format.

SUMMARY

In order to enable use of a network resource by multiple entities that require different data formats, to reduce instances of incompatibility of various entities and increase accessibility of data or network resources, data stored in a first format can be automatically converted to a second format for access by an entity that requires the data to be in the second format. For example, a printer, or other peripheral device or system component may be configured to output information related to data files only if the data files have a proprietary format associated with a manufacturer or the device or a software product, or of the operator of the printer. A computer application that interacts with the printer can convert data to the format required by the printer before sending the data to the printer. In some implementations, the application utilizes a configuration file that enables the application to transmit a data stream to the printer in the required format.

In one aspect, a method for formatting travel data includes receiving instructions to transmit travel object data to a hardware device. The travel object data has a first data format, and the hardware device utilizes a second data format. The method also includes accessing the travel object data, accessing travel object configuration data, and converting the travel object data to the second data format according to the travel object configuration data. The method further includes transmitting the travel object data having the second data format to the hardware device.

Implementations may include one or more of the following features. For example, the method may include identifying a first portion of the travel object data having the first format based on the travel object configuration data, and performing an operation to modify the first portion of the travel object data. The operation may be specified by the travel object configuration data. In addition, the hardware device may be a printer and the travel object data may be associated with a travel ticket object, a travel receipt object, or a baggage tag object.

In some examples, the method may include identifying the first format and the second format and selecting the travel object configuration data based on the first format and the second format. In these examples, the first format may be identified based on a location from which the instructions are received.

In another aspect, a system includes a data repository storing travel object data having a first format, a data repository storing travel object configuration data, and an output device. The system also includes a computer processor operable to convert the travel object data having the first format to travel object data having a second format based on the travel object configuration data, and to transmit the travel object data having the second format to the output device for use in generating an output.

Implementations may include one or more of the following features. For example, the system may include a user terminal operable to control the computer processor. In this example, the data repository storing travel object data having a first format may be associated with a first provider of travel products, and the system may include a data repository storing travel object data having a third format and associated with a second provider of travel products.

In yet another aspect, a tangible computer-readable storage medium has a computer program product stored thereon. The computer program product includes instructions that, when executed by one or more computer processors, enable operations that include receiving instructions to transmit travel object data to a hardware device. The travel object data has a first data format, and the hardware device utilizes a second data format. The operations also include accessing the travel object data, accessing travel object configuration data, and converting the travel object data to the second data format according to the travel object configuration data. The operations further include transmitting the travel object data having the second data format to the hardware device.

Implementations may include one or more of the following features. For example, the operations may include identifying a first portion of the travel object data having the first format based on the travel object configuration data, and performing an operation to modify the first portion of the travel object data. The operation may be specified by the travel object configuration data. In addition, the hardware device may be a printer and the travel object data may be associated with a travel ticket object, a travel receipt object, or a baggage tag object.

In some examples, the operations may include identifying the first format and the second format and selecting the travel object configuration data based on the first format and the second format. In these examples, the first format may be identified based on a location from which the instructions are received.

The details of one or more implementations are set forth in the accompanying drawings and the description below. Other features will be apparent from the description and drawings, and from the claims.

DETAILED DESCRIPTION

Common use of a network resource, such as a hardware device, by different network entities may be desired in some instances. Where a hardware device or other network resource is operable with a single required data format, availability of the hardware device is limited to those network entities that also utilize the required data format. For example, a printer device may be configured to print boarding pass documents for passengers, and may require data in a first format in order to print a document. In order to make the printer available to multiple network entities that use different data formats, such as data of multiple airlines that maintain data regarding passenger records in different formats, the format of the data can be converted to the format required by the printer such that passenger documents (e.g., boarding passes) from multiple airlines can be printed at a single printer in the format required by that airline. The configuration of printers for common use for multiple data formats can be based on the concept of "login locations," that correspond to network entities or workstations. Each login location can use either common use or non-common use printers. For login locations that use common use printers, an emulator pass-through technique is used to transmit data to a printer in a format required by the printer. As one example this feature provides additional flexibility in commercial airports that allow multiple different airlines to share gates within the terminal. The multiple different airlines then also share the gate agent desk and computer equipment used to service passenger requests such as changing seats, processing upgrades and standby lists and printing new boarding documents. The computer equipment and document printers must be able to print boarding passes formatted in the style and with the information required by the particular airline. Rather than the airline having a dedicated printer that only prints boarding documents for that airline, the present system allows data from a particular airline to be transferred into the format required for printing on the printer located at that particular gate agent desk.

Figure 1:
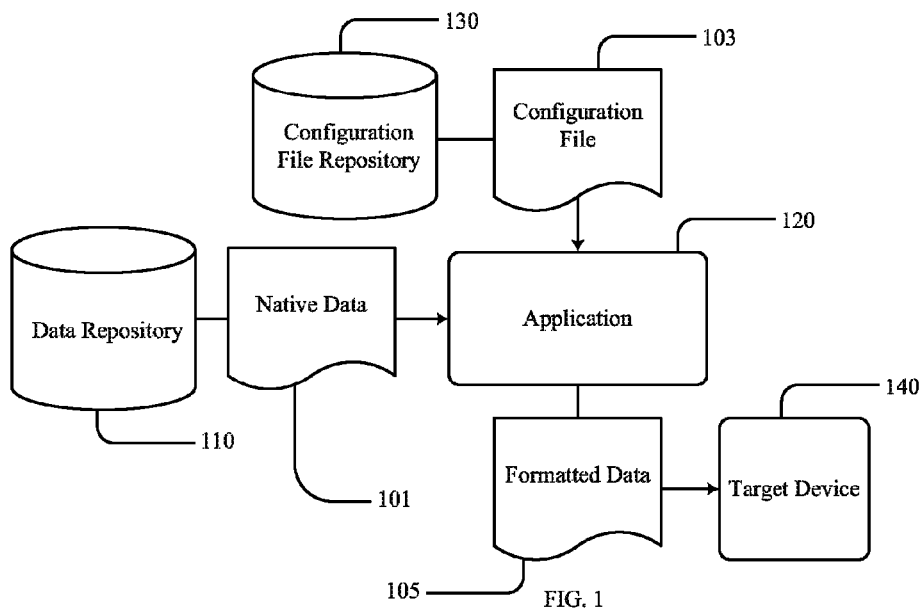
FIG. 1 is a diagram of a system for formatting data for use by a device.
Figure 2:
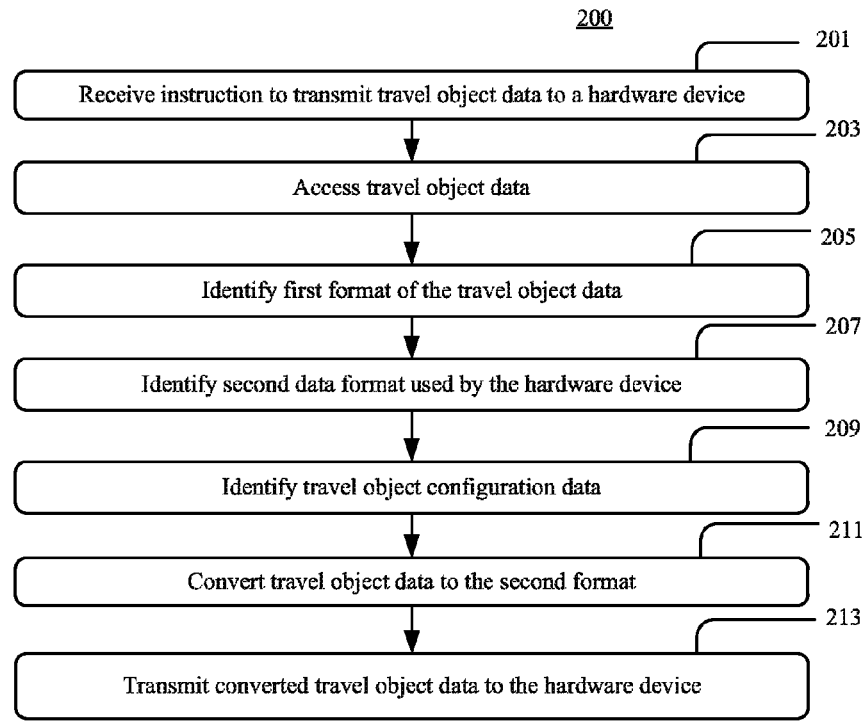
FIG. 2 is a diagram of a process for formatting data.

With reference to FIGS. 1 and 2, a system 100 is operable to format native data 101 for use by a particular target device 140 according to a process 200. In the system 100, the native data 101 is stored in a data repository 110 and is accessible by an application 120. A configuration file 103 stored in a configuration file repository 130 is also accessible to the application 120. The configuration file 103 is used by the application 120 to convert the native data 101 into formatted data 105, which is transmitted to the target device 140. The application 120 can access data 101 from the data repository 110 in a native format used by the entity that generates and/or maintains the data 101. The system 100 and application 120 can also provide a display to a user and may optionally enable modification of the data 101 based on user input.

With reference to FIG. 2, in order to transmit the data 101 to the target device 140, the application 120 receives an instruction to transmit data 101, such as travel object data, to the particular device 140 (201). After receiving the instruction, the application 120 accesses the data 101 (203), and identifies a first format, e.g., the native format, of the data 101 (205). The application 120 also identifies a second data format used or required by the particular hardware device 140 (207). Based on the identified first and second data formats, the application 120 identifies the configuration file 103 associated with the first and second data formats and requests the configuration file 103 from the configuration file repository 130 (209).

The configuration file 103 includes information that is further processed by the application 120 to convert the data 101 from the first format to the second format (211). The application 120 then generates a data stream of formatted data 105 and transmits the formatted data 105 to the target device 140 (213). For example, the application 120 can use the configuration file 103 to identify portions of the native data 101 that contain information to be used by the target device 140. The identified portions of the native data 101 are used to generate the formatted data 105. In some instances, the application 120 adds data to and/or removes data from the identified portions of the native data 101 in order to convert the data to the second format.

Figure 3:
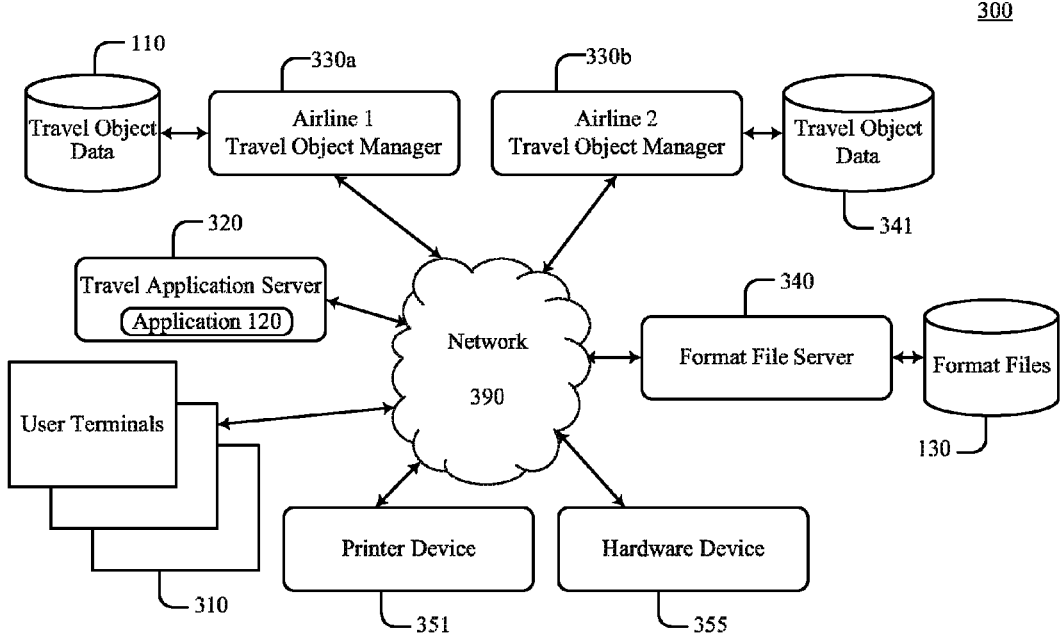
FIG. 3 is a diagram of a system for formatting travel data.

In some implementations, as illustrated in FIG. 3, the application 120 can be used in an airline operation system 300 to transmit a wide variety of travel object data, such as data regarding airline or other travel product purchase or reservation information to various network entities, such as a printer device 351 or another hardware device 355. The application 120 processes and transmits the data regarding the travel objects in an appropriate format for use by the network entities. The airline operation system 300 includes user terminals 310 that are accessible by airline agents, airline customers, or other individuals to access, review, modify, and transmit travel object data from travel object data repositories 110 and 341 associated with different airlines or other providers of travel-related goods and services. For example, an airline agent, or a passenger in a self-service environment, can use a workstation terminal 310 to access the application 120 via a travel application server 320 over a computer network 390.

The travel application server 320 can include one or more applications 120 that are used to perform various airline operation functions, such as checking-in passengers and/or printing travel documents, such as boarding documents, itineraries, standby documents, receipts, luggage tags, or other travel documents. In particular, the travel application server 320 can allow access to the travel object data repository 110 associated with a first airline through a travel object manager 330a associated with a first airline and can allow access to the travel object data repository 341 associated with a second airline through a second travel object manager 330b. Thus, where a customer has reserved an itinerary that involves one or more flight segments provided by cooperating airline partners, the customer can be checked in at the user terminal 310 and boarding documents for all flight segments can be printed at the printer device 351 associated with the user terminal 310 regardless of the native format of the travel object data associated with the flight segment reservation objects. Similarly, the user terminal 310 can be used to check in different passengers of different airlines at different times.

In an example implementation, a check-in agent can access the application 120 via the user terminal 310 to check-in a passenger for a flight on Airline 1. The application 120 accesses data stored in the travel object data repository 110 associated with the passenger. If desired, the agent can modify the data associated with the passenger, such as by assigning or re-assigning a seat, or by adding information regarding an additional service purchased by or assigned to the passenger. Similarly, the agent can update profile data associated with the passenger, such as by adding information regarding a loyalty program account associated with the passenger. When the agent is ready to print the passenger's boarding pass, the agent instructs the application to transmit data of a boarding pass travel object to the printer 351. Based on the instruction to transmit data, the application accesses the travel object data associated with the boarding pass object and identifies a native format of the travel object data. The application also determines one or more compatible data formats associated with the printer 351. If the native data format is not a compatible data format associated with the printer 351, the application accesses a format file stored in the format file repository 130 from a format file server 340. As discussed above, the application 120 converts the travel object data associated with the passenger's boarding pass to a compatible data format associated with the printer 351 according to the format file.

Figure 4:
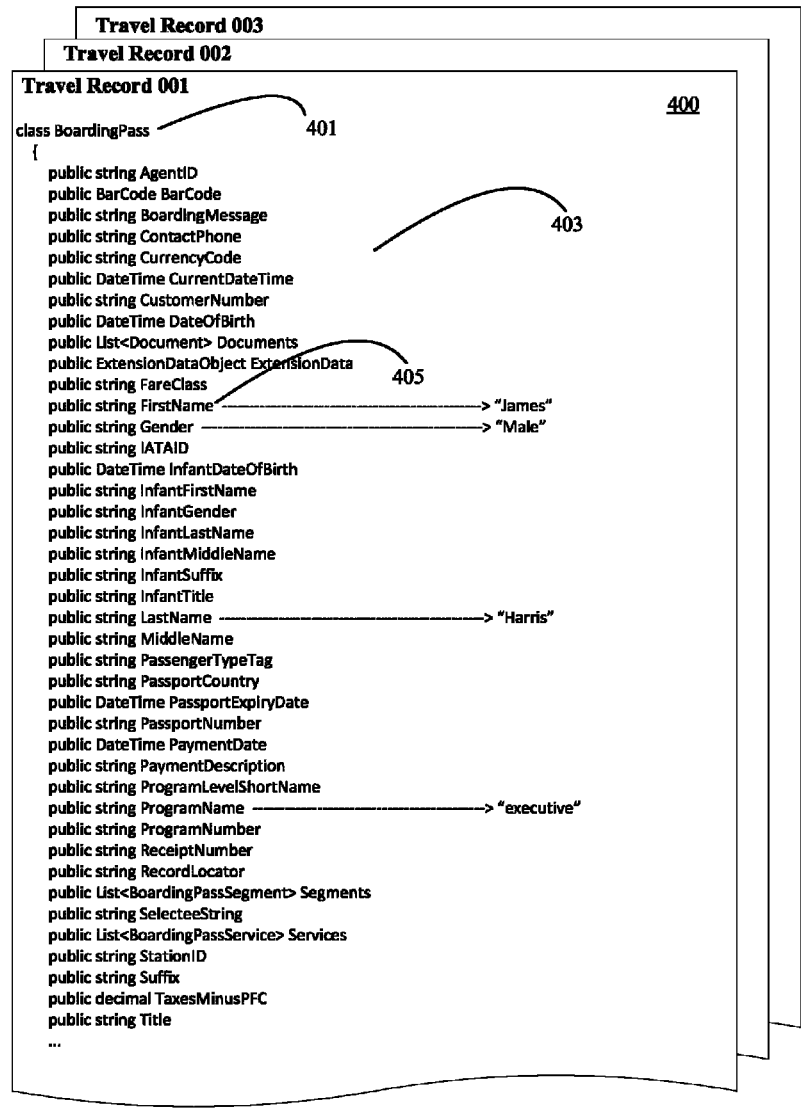
FIG. 4 is a diagram of a data structure of a travel record.

For example, the Travel Record 001 of FIG. 4 illustrates a portion of data structure 400 of the travel object data repository 110 that defines a boarding pass travel object. As shown, the data structure 400 includes information 401 regarding the title of the travel object class, and information 403 regarding information included in the travel object class. For example, a boarding pass travel object includes information 405 regarding the first name of a passenger associated with a particular boarding pass. As shown, the travel object data repository 110 includes data indicating that the first name of a passenger associated with a particular boarding pass travel object is "James." Similarly, the travel object data repository 110 includes data indicating that the passenger associated with the particular boarding pass travel object is a male, has the last name "Harris" and is a member of the "Executive" loyalty program. Though not illustrated, it should be understood that the travel object data repository can include information regarding one or more of the other listed categories of information and/or information regarding one or more other categories of information, such as flight origin location, flight destination location, flight carrier information, flight number information, departure date information, departure time information, departure gate information, and/or seat assignment information, among others.

Figure 5:
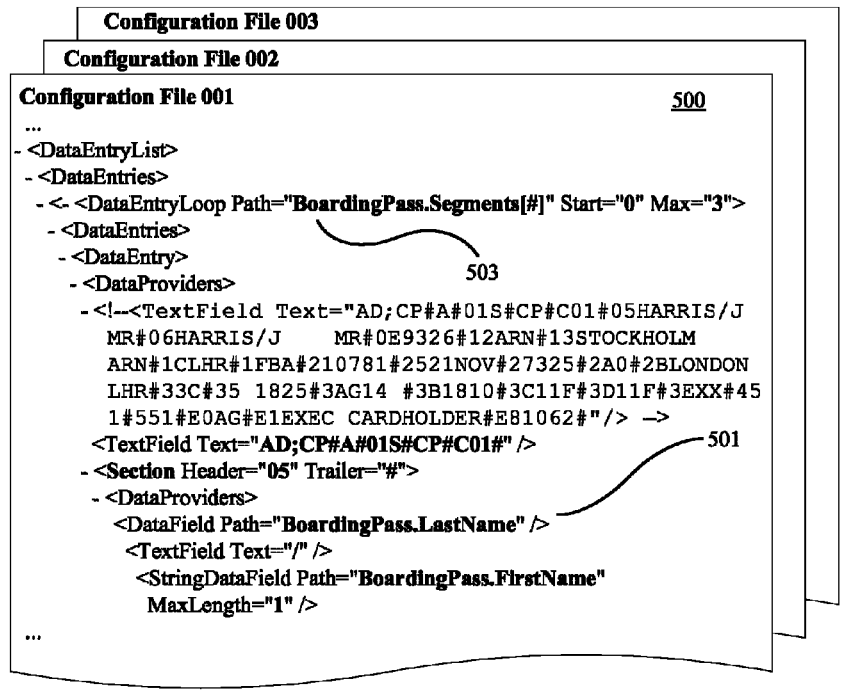
FIG. 5 is a diagram of a data structure of a configuration file.

Now referring to FIG. 5, the Configuration File 001 illustrates a portion of a data structure 500 of the format file repository 130. As illustrated, the Configuration File 001 includes computer-executable instructions operable to generate a data stream in a format suitable for use by a target device. For example, the data structure 500 includes instructions 501 for generating a data stream for use by a printer to print a portion of a boarding pass, such as the boarding pass 600 of FIG. 6. The instructions 501 cause the application to create a data stream that includes last name information and first name information associated with a header "05" based on the entry "<Section Header="05"Trailer="#">." The instructions 501 identify a source of the last name information based on the entry "<DataField Path="BoardingPass.LastName"/>" and a source of the first name information based on the entry "<StringDataField Path="BoardingPass.FirstName". The instructions also identify formatting operations. As shown, the instructions 501 cause the entire last name to be shown, cause the last character of the last name to be followed by a forward slash based on the entry "<TextField Text="/"/>" and cause only the first character of the first name to follow the forward slash based on the entry "MaxLength="1"/>."

The data structure 500 also includes similar instructions (not shown) that cause the application to create a data stream with information regarding other components of the boarding pass. The instructions can utilize a similar technique of identifying data stored in the travel object data repository 110 and may include instructions to add characters to the data, remove characters from the data, or perform other operations on the data. For example, time information can be converted to a different format. Similarly, price information can be generated by adding component prices, such as a base price amount and a fee amount, and/or by multiplying a price amount by a discount rate or a surcharge rate. In some implementations, additional information can be included in the data stream based on data stored in the travel object data repository 110, or another data storage device. For example, if a balance due is greater than zero, a message indicating that payment is required can be included in the data stream. Again, the balance due information may be stored in the travel object data repository 110 or may be determined from information stored in the travel object data repository 110. Additionally, the instructions can cause the application to loop through two or more travel objects. For example, the instructions 503 cause the application to create a data stream to print a separate boarding pass for each segment of a flight. As will be understood, many other operations can be performed to generate the data stream based on the configuration file in order to generate printed documents having a desired layout and desired content.

Figure 6:
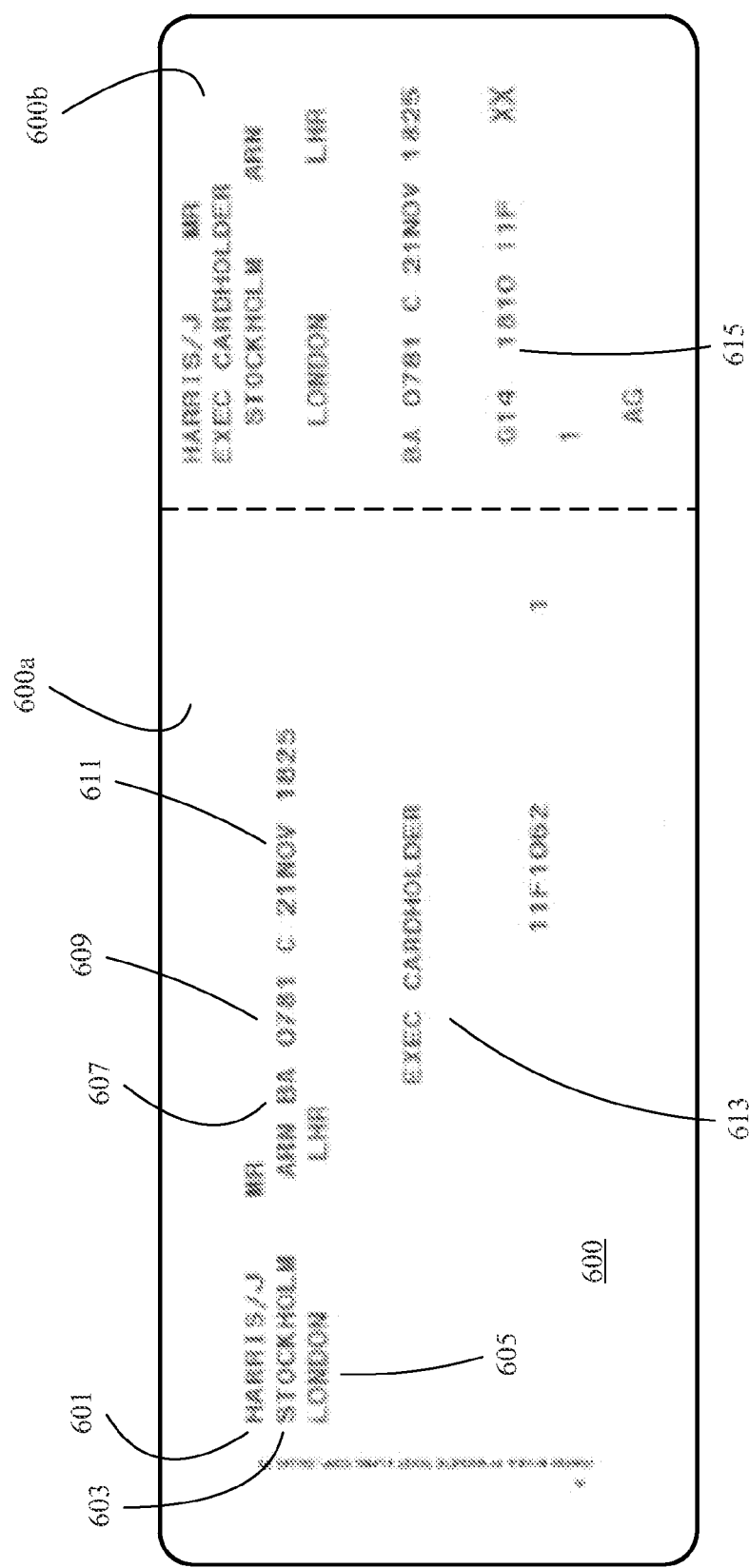
FIG. 6 is an illustration of a printed travel document

As shown in FIG. 6, a boarding pass 600 includes a first section 600a and a second section 600b. The first section 600a includes passenger name information 601, origin location information 603, destination location information 605, carrier information 607, flight number information 609, date information 611, and passenger account information 613. The second section 600b includes some or all of the information included in the first portion 600a and also includes departure and seat assignment information 615. As described above, the boarding pass 600 is generated by a printer based on a data stream received from an application based on the Configuration File 001, or another configuration file, and based on information associated with a boarding pass travel object.

Figure 7:
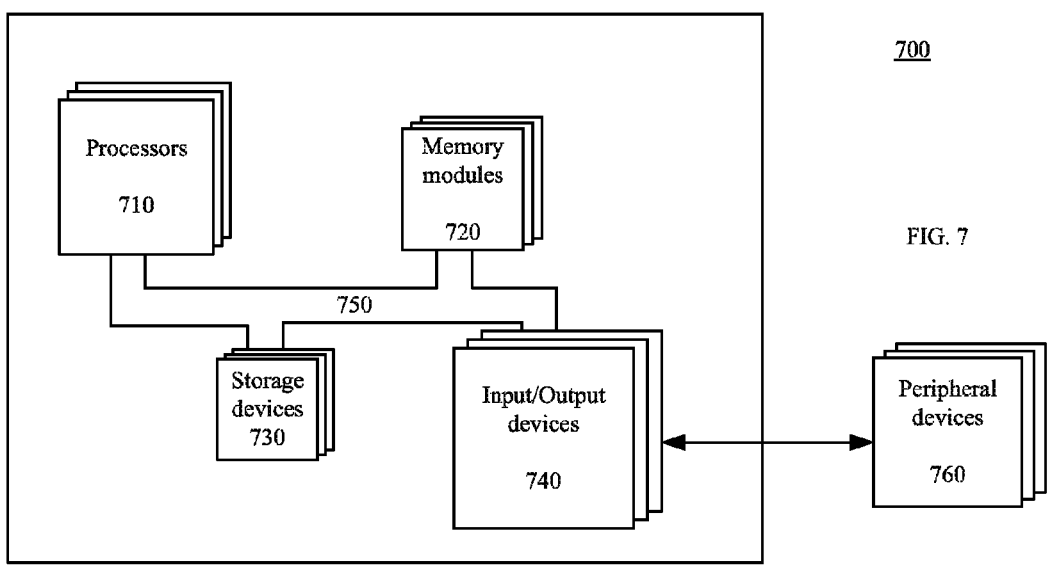
FIG. 7 is a diagram of a computer system.

Referring to FIG. 7, the application 120 may be implemented as a computer software product that is executed by a computer system 700. Additionally, one or more other components of the systems 100 and 300 can include one or more computer systems, such as the computer system 700, or components thereof. The computer system 700 includes one or more processors 710, memory modules 720, storage devices 730, and input-output devices 740 connected by a system bus 750. The input-output devices 740 are operable with one or more peripheral devices 760, including a communication device that is operable to communicate with other computer systems or components thereof. Other peripheral device that may be included in the computer system 700 include output devices such as displays, speakers, and printers, and input devices such as pointers, microphones, keyboards, and scanners. The one or more computer systems 700 can perform the various functions described in this disclosure by executing computer instructions embodied in computer software stored on a computer-readable storage device, such as the memory modules 720, the storage devices 730, and/or the peripheral devices 760.

A number of implementations have been described. Nevertheless, it will be understood that various modifications may be made without departing from the spirit and scope of the disclosure. Accordingly, other implementations are within the scope of the following claims. For example, although the system 300 is illustrated as a distributed system with separate components connected via the network 390, one or more of the user terminal 310, the travel application server 320, the travel object managers 330a and 330b, and the travel object data repositories 110 and 341 can be located in the same physical location and/or the same computer system, or each can be maintained in separate locations and/or computer systems. Similarly, functions described with respect to one component may be performed by two separate components, and functions described with respect to separate components can alternatively be performed by a single component. For example, the travel application server can be integrated into a system component that maintains and manages travel object data as well as provides all of the required functions of an airline customer that involve the travel object data, including creation and modification of travel object data that relates to travel products and services purchased by customers, as well as ancillary functions, such as payment processing and customer account management, among others. With regard to the processes described above, the steps of the described processes can be performed in any order that achieves the described results. Additionally, while particular examples of the instructions of the data structure 500 associate with a configuration file have been included, alternative instructions can be used to accomplish the functions of the configuration file described above. For example, the instructions may be provided using different coding and/or different programming languages that illustrated in this disclosure.

The invention claimed is:

1. A computer-implemented method for formatting travel data, comprising:
   receiving, by one or more processors, and at a travel station shared by a plurality of travel providers, instructions to transmit travel object data to a common-use hardware device accessible to the plurality of travel providers, wherein the travel object data is associated with a passenger request having a cost associated with a plurality of component prices and has a first data format that is specific to a particular travel provider of the plurality of travel providers, wherein the particular travel provider provides a segment of a travel itinerary, and wherein the common-use hardware device utilizes a second data format;
   accessing, by the one or more processors, the travel object data via a travel object manager that is specific to the particular travel provider;
   modifying, by the one or more processors, the travel object data to include data related to an additional item purchased in association with the passenger request;
   identifying, by the one or more processors, the first data format based on the particular travel provider and the travel station at which the instructions are received;
   identifying, by the one or more processors, the second data format utilized by the hardware device;
   accessing, by the one or more processors, travel object configuration data based on the first data format and the second data format;
   converting, by the one or more processors, the first data format of the travel object data to the second data format according to the travel object configuration data such that converted travel object data can be processed by the hardware device, the converting comprising adding characters to and removing characters from the travel object data;
   generating, by the one or more processors, payment information comprising a balance due based on the plurality of component prices and the additional item purchased in association with the passenger request;
   transmitting, by the one or more processors, the travel object data having the second data format and the payment information associated with the passenger request to the common-use hardware device;
   processing, by the one or more processors, and at the common-use hardware device, the converted travel object data to generate a travel boarding document associated with the segment of the travel itinerary and having a layout specific to the particular travel provider;
   providing, by the one or more processors, the travel boarding document at the common-use hardware device; and
   looping through the instructions, by the one or more processors, to provide an additional travel boarding document at the common-use hardware device, the additional travel boarding document being associated with another segment of the travel itinerary that is provided by another travel provider of the plurality of travel providers, and the additional travel boarding document being generated based on additional travel object data that is associated with the passenger request received at the travel station and that has been converted from a third data format, specific to the other travel provider, to the second data format.

2. The computer-implemented method of claim 1, wherein each of the plurality of travel providers provides a same mode of travel.

3. The computer-implemented method of claim 2, wherein the plurality of travel providers comprises a plurality of airlines, and the segment of the travel itinerary comprises a flight segment.

4. The computer-implemented method of claim 1, wherein the second data format is a common-use format that is specific to the common-use hardware device.

5. The computer-implemented method of claim 1, wherein the common-use hardware device is a printer.

6. The computer-implemented method of claim 1, wherein the travel object data comprises information associated with one or more of a travel ticket object, a travel receipt object, or a baggage tag object.

7. The computer-implemented method of claim 1, wherein the travel object data is stored in a repository that is specifically associated with the particular travel provider.

8. The computer-implemented method of claim 7, wherein the payment information is stored in the repository.

9. The computer-implemented method of claim 1, wherein the payment information is stored separately from the travel object data.

10. A non-transitory computer-readable storage medium coupled to one or more processors and having instructions stored thereon which, when executed by the one or more processors, cause the one or more processors to perform operations for formatting travel data, the operations comprising:
   receiving, at a travel station shared by a plurality of travel providers, instructions to transmit travel object data to a common-use hardware device accessible to the plurality of travel providers, wherein the travel object data is associated with a passenger request having a cost associated with a plurality of component prices and has a first data format that is specific to a particular travel provider of the plurality of travel providers, wherein the particular travel provider provides a segment of a travel itinerary, and wherein the common-use hardware device utilizes a second data format;
   accessing the travel object data via a travel object manager that is specific to the particular travel provider;
   modifying the travel object data to include data related to an additional item purchased in association with the passenger request;
   identifying the first data format based on the particular travel provider and the travel station at which the instructions are received;
   identifying the second data format utilized by the hardware device;

accessing travel object configuration data based on the first data format and the second data format;

converting the first data format of the travel object data to the second data format according to the travel object configuration data such that converted travel object data can be processed by the hardware device, the converting comprising adding characters to and removing characters from the travel object data;

generating payment information comprising a balance due based on the plurality of component prices and the additional item purchased in association with the passenger request;

transmitting the travel object data having the second data format and the payment information associated with the passenger request to the common-use hardware device;

processing and at the common-use hardware device, the converted travel object data to generate a travel boarding document associated with the segment of the travel itinerary and having a layout specific to the particular travel provider;

providing the travel boarding document at the common-use hardware device; and looping through the instructions to provide an additional travel boarding document at the common-use hardware device, the additional travel boarding document being associated with another segment of the travel itinerary that is provided by another travel provider of the plurality of travel providers, and the additional travel boarding document being generated based on additional travel object data that is associated with the passenger request received at the travel station and that has been converted from a third data format, specific to the other travel provider, to the second data format.

11. The non-transitory computer-readable storage medium of claim 10, wherein each of the plurality of travel providers provides a same mode of travel.

12. The non-transitory computer-readable storage medium of claim 11, wherein the plurality of travel providers comprises a plurality of airlines, and the segment of the travel itinerary comprises a flight segment.

13. The non-transitory computer-readable storage medium of claim 10, wherein the second data format is a common-use format that is specific to the common-use hardware device.

14. The non-transitory computer-readable storage medium of claim 10, wherein the common-use hardware device is a printer.

15. The non-transitory computer-readable storage medium of claim 10, wherein the travel object data comprises information associated with one or more of a travel ticket object, a travel receipt object, or a baggage tag object.

16. The non-transitory computer-readable storage medium of claim 10, wherein the travel object data is stored in a repository that is specifically associated with the particular travel provider.

17. The non-transitory computer-readable storage medium of claim 16, wherein the payment information is stored in the repository.

18. The non-transitory computer-readable storage medium of claim 10, wherein the payment information is stored separately from the travel object data.

19. A system, comprising:
one or more processors; and
a computer-readable storage medium coupled to the one or more processors having instructions stored thereon which, when executed by the one or more processors, cause the one or more processors to perform operations for formatting travel data, the operations comprising:

receiving, at a travel station shared by a plurality of travel providers, instructions to transmit travel object data to a common-use hardware device accessible to the plurality of travel providers, wherein the travel object data is associated with a passenger request having a cost associated with a plurality of component prices and has a first data format that is specific to a particular travel provider of the plurality of travel providers, wherein the particular travel provider provides a segment of a travel itinerary, and wherein the common-use hardware device utilizes a second data format, accessing the travel object data via a travel object manager that is specific to the particular travel provider, modifying the travel object data to include data related to an additional item purchased in association with the passenger request, identifying the first data format based on the particular travel provider and the travel station at which the instructions are received, identifying the second data format utilized by the hardware device, accessing travel object configuration data based on the first data format and the second data format, converting the first data format of the travel object data to the second data format according to the travel object configuration data such that converted travel object data can be processed by the hardware device, the converting comprising adding characters to and removing characters from the travel object data, generating payment information comprising a balance due based on the plurality of component prices and the additional item purchased in association with the passenger request, transmitting the travel object data having the second data format and the payment information associated with the passenger request to the common-use hardware device, processing and at the common-use hardware device, the converted travel object data to generate a travel boarding document associated with the segment of the travel itinerary and having a layout specific to the particular travel provider, providing the travel boarding document at the common-use hardware device, and looping through the instructions to provide an additional travel boarding document at the common-use hardware device, the additional travel boarding document being associated with another segment of the travel itinerary that is provided by another travel provider of the plurality of travel providers, and the additional travel boarding document being generated based on additional travel object data that is associated with the passenger request received at the travel station and that has been converted from a third data format, specific to the other travel provider, to the second data format.

20. The system of claim 19, wherein each of the plurality of travel providers provides a same mode of travel.

21. The system of claim 20, wherein the plurality of travel providers comprises a plurality of airlines, and the segment of the travel itinerary comprises a flight segment.

22. The system of claim 19, wherein the second data format is a common-use format that is specific to the common-use hardware device.

23. The system of claim 19, wherein the common-use hardware device is a printer.

24. The system of claim 19, wherein the travel object data comprises information associated with one or more of a travel ticket object, a travel receipt object, or a baggage tag object.

25. The system of claim 19, wherein the travel object data is stored in a repository that is specifically associated with the particular travel provider.

26. The system of claim 25, wherein the payment information is stored in the repository.

27. The system of claim 19, wherein the payment information is stored separately from the travel object data.

* * * * *